United States Patent [19]

Tellier et al.

[11] 4,192,857

[45] Mar. 11, 1980

[54] SULPHUR PRODUCTION

[75] Inventors: Jacques Tellier, Pau; André Philippe; Pierre Mathieu, both of Orthez; Robert Voirin, Mourenx, all of France

[73] Assignee: Societe Nationale Elf Aquitaine (Production), Paris, France

[21] Appl. No.: 851,509

[22] Filed: Nov. 14, 1977

Related U.S. Application Data

[63] Continuation of Ser. No. 733,116, Oct. 18, 1976, abandoned.

[30] Foreign Application Priority Data

Oct. 17, 1975 [FR] France .............................. 75 31769

[51] Int. Cl.² .............................................. C01B 17/04
[52] U.S. Cl. .................................. 423/576; 423/219
[58] Field of Search ..................... 423/574, 576, 219

[56] References Cited

U.S. PATENT DOCUMENTS

| 2,787,519 | 4/1957 | Hammar | 423/219 |
| 3,554,689 | 1/1971 | Bloembergen | 423/219 |
| 3,725,531 | 4/1973 | Pearson et al. | 423/576 |
| 3,939,250 | 2/1976 | Michel et al. | 423/576 X |
| 3,978,004 | 8/1976 | Daumas et al. | 423/576 X |

FOREIGN PATENT DOCUMENTS

| 13844 of 1896 | United Kingdom | 423/574 |
| 524345 8/1940 | United Kingdom | 423/574 |

*Primary Examiner*—G. O. Peters
*Attorney, Agent, or Firm*—Ostrolenk, Faber, Gerb & Soffen

[57] ABSTRACT

The Claus process for the production of sulphur is improved by employing a deoxidation catalyst prior to the conventional Claus oxide catalyst.

11 Claims, No Drawings

SULPHUR PRODUCTION

This is a continuation of application Ser. No. 733,116, filed Oct. 18, 1976, now abandoned.

This invention relates to an improvement in sulphur production, in particular by the process known as the CLAUS process. The industrial and economic importance of the CLAUS process for sulphur production is well known, this process being applied both in sulphur manufacture and in the desulphurisation of certain gases. In such a process, a gas containing $H_2S$ and originating, for example, from the desulphurisation of natural gas or the hydrodesulphurisation of petroleum products is fed into a combustion zone, in which part of the hydrogen sulphide is oxidised by air at high temperature (of the order of 1000° C.) into sulphur and $SO_2$, the effluent from this combustion zone being fed, after condensing the sulphur contained therein, to a catalytic oxidation zone consisting of several converters disposed in series and maintained at temperatures between 200° and 400° C. These latter may be followed by an additional converter operating at a temperature below the dewpoint of sulphur and periodically subjected to regeneration. The hydrogen sulphide contained in said effluent is then oxidised to sulphur in said catalytic zone in accordance with the reaction:

$$2H_2S + SO_2 \rightleftharpoons (3/x) S_x + 2H_2O \qquad (1)$$

to provide further quantities of sulphur.

In one modification of this process, the gas containing $H_2S$ and $SO_2$ is fed directly to the catalytic converters, the gas having been obtained by adding to a gas containing $H_2S$, a suitable quantity of $SO_2$ originating from any sources such as sulphur combustion, residual gases containing $SO_2$ or the like.

The catalysts used in the converters for making the reaction (1) as complete as possible at the oxidation temperatures in the converters are the most usual oxides, such as activated alumina or bauxite, which give excellent results. However, a weak point in the process is the fact that the catalyst is very sensitive to the presence of oxygen in the gases to be processed. Thus it has been found that in the presence of weak concentrations of oxygen in the gas fed into a converter in the CLAUS process, the activity of the alumina used as the catalyst falls regularly with time. This requires frequent replacement of the catalyst charges to prevent a fall in the efficiency of the CLAUS installation and the simultaneous increase in atmospheric pollution, which would be caused by this reduction in activity. To avoid this disadvantage, the method may be used as proposed for example in the French Pat. No. 2 190 517, i.e. replacing the traditional catalyst, in particular alumina, with similar oxides containing oxides, sulphides or other compounds of the metals molybdenum, cobalt, nickel, iron and/or uranium. This method is not viable above 200° C. and is of acceptable efficiency only when the time of contact between the gas and catalyst is fairly long, namely eight seconds or longer. Moreover, it requires that the entire catalyst mass which is to be brought into contact with the gas to be desulphurised is impregnated with the metal compound, which in economic terms means considerable additional cost, taking account of the large quantities of catalyst used in traditional CLAUS installations.

The object of the present invention is to overcome the disadvantage of the sensitivity of CLAUS catalysts to oxygen by a new catalytic processing combination, in which the traditional catalyst for sulphur production is protected against the possible presence of oxygen in the treated gas. The new process according to the invention thus enables the CLAUS process to be carried out at any appropriate temperature with a practically constant high efficiency. The improvement according to the invention involves first passing the gas to be processed through a bed of deoxidation catalyst before subjecting it to the CLAUS reaction over the traditional catalyst for this latter.

A preferred embodiment of the invention involves modifying the CLAUS reactors in the position where the sulphur is formed from $2H_2S + SO_2$, by replacing part of the traditional catalyst at the reactor inlet by an oxide catalyst containing transition metals. In other words, in the new process when the gas to be processed enters the CLAUS converter, it first encounters a bed of deoxidation catalyst of suitable thickness, which it is obliged to pass before penetrating the bed of actual CLAUS catalyst. Because of this superimposing of the two catalysts, the efficiency of sulphur production does not fall with time, even if the gas to be processed contains a certain amount of oxygen, for example up to about 5000 vpm. In a further embodiment of the invention, the traditional reactors for the reaction (1) are preceded by a deoxidation reactor charged with a catalyst containing a transition metal compound.

The deoxidation catalyst according to the invention is preferably of a support of alumina, bauxite, silica, a mixture of silica and alumina and/or a silico-aluminate containing a compound of Fe, Ni, Co, Cu and/or Zn. This compound may be an oxide, a sulphide or a mineral or organic acid salt, e.g. sulphate, nitrate, phosphate, acetate etc. This catalyst contains approximately 0.5 to 10%, and preferably 2 to 6% of metal by weight relative to the oxide catalyst. The support must have a specific area, determined by the BET method, of at least 100 $m^2/g$, and preferably greater than 150 $m^2/g$. The porous volume must exceed 0.20 ml/g.

The deoxidation catalysts usable in the process according to the invention may be prepared by one of the known methods, in particular by impregnating the support with an aqueous or other solution of the metal compound, coprecipitation etc.

Although some of these catalysts are already known and used in oxidising sulphur-based compounds, such as in the case of alumina containing iron or zinc sulphide, their application in the particular combination of the present invention is completely new. In effect, this combination comprises superimposing these deoxidation catalysts on those for the reaction (1), i.e. in particular on activated alumina or bauxite. This new combination gives unexpected results, in that it overcomes the disadvantages both of the traditional CLAUS process and of the sole use of catalysts containing transition metals, such as described for example in the French Pat. No. 2 190 517.

In the new combination according to the invention, the volume of deoxidation catalyst is generally smaller than that of the traditional catalyst of the CLAUS process. Most frequently, the volume of the former is equal to about 5 to 50% of the volume of the latter, according to the amount of oxygen in the gas to be processed. In practice, the volume of the space occupied by the deoxidation catalyst is generally 10 to 40% of the space occupied by the CLAUS catalyst. In the industrial embodiment of the reactors according to the present invention, the thickness of the deoxidation catalyst bed may be calculated from the necessary time of contact between the gas and catalyst, this time being generally 0.1 to 3 s NTP. Analogous relationships are applicable when one or both catalyst beds are not fixed, but fluidised.

The two catalytic beds may operate at the same temperature, in practice between 100° and 400° C. However it is possible to operate the deoxidation bed at a temperature different from that of the actual converter, according to requirements. When the CLAUS reaction is carried out at temperatures less than the dewpoint of the sulphur, the deoxidation catalyst is also utilised at these temperatures, in particular between 100° and 180° C., and preferably between 120° and 160° C. In this case, it is advantageous to periodically desulphurise the deoxidation catalyst by heating in a current containing $H_2S$ at a temperature of 250° to 400° C., in known manner, so as to remove the sulphur retained in its pores and restore its activity. This operation is evidently unnecessary if the catalyst beds are kept between 180° and 400° C.

As the deoxidation catalyst itself has a certain activity in effecting the reaction (1), its advantage is double, in that not only does it protect the traditional catalyst by eliminating oxygen, but it also converts part of the $2H_2S+SO_2$ mixture into elementary sulphur.

The non-limiting examples given hereinafter illustrate the invention.

EXAMPLE 1

A deoxidation catalyst is prepared by impregnating one liter of activated alumina, in the form of 4 to 6 mm balls, with an aqueous solution of ferrous sulphate containing 90 g of metallic iron per liter in a slightly sulphuric medium. The impregnation lasts for one hour. After draining, the alumina is dried for three hours at 120° C., then reacted in air at 350° C. for three hours.

The catalyst no obtained contains 4.74% of iron by weight, has a specific area of 220 $m^2/g$ and a specific volume of 0.415 $cm^3/g$. 131 g (i.e. 181 $cm^3$) of this catalyst are placed in a tubular reactor of 25 nm diameter, which is isothermally heated in an electric furnace. A gas is passed through this tube at a flow rate of 2 $m^3/h$, the gas containing 2.5% $H_2S$, 1.5% $SO_2$ and 27% $H_2O$ by volume, the rest consisting of nitrogen and carbon dioxide. The gas also contains 0.2% of oxygen.

The oxygen content of the effluent from the reaction tube is determined as a function of temperature.

The results obtained are given in table I below:

TABLE I

| Temperature (° C.) | 250 | 260 | 320 |
|---|---|---|---|
| Oxygen content of effluent (vpm) | 13 | 12 | 4 |
| Oxygen conversion (%) | 99.35 | 99.4 | 99.8 |

It is seen that the catalyst according to the invention allows very high removal of the oxygen contained in the processed gas.

EXAMPLE 2

685 g (913 $cm^3$) of activated alumina in the form of balls of diameter between 5 and 10 mm and specific area of 295 $m^2/g$ are placed in an adiabatic reactor, in which the gas inlet temperature is kept at 250° C.

A gas is passed through this reactor at a flow rate of 2 $m^3/h$ (measured at normal conditions), the gas containing 2.5% $H_2S$, 1.25% $SO_2$, 27% $H_2O$ and 0.1% $O_2$ by volume, the remainder being nitrogen and carbon dioxide.

After 500 hours of operation, the sulphur yield in 28.5%.

EXAMPLE 3

200 g (276 $cm^3$) of the catalyst prepared as described in example 1 are placed in a reactor analogous to that of Example 2, followed by 485 g (647 $cm^3$) of the same alumina as used in Example 2. A gas of the same composition, flow rate and temperature as in Example 2 is passed through the reactor, the gas encountering firstly the deoxidation catalyst and then the alumina. After 700 hours of operation, the sulphur yield is 60.1%. In comparing the results obtained in this example, incorporating the improvement according to the invention (a bed of deoxidation catalyst preceding the bed of traditional CLAUS catalyst), with the results of Example 2 (traditional CLAUS catalyst alone), it is seen that when operating under the conditions of the invention, the fall in the activity of the CLAUS reaction catalyst caused by the presence of oxygen in the processed gas is strongly reduced.

EXAMPLE 4

The operation is conducted under the same conditions as those of Example 3, but the deoxidation catalyst, i.e. alumina impregnated with iron sulphate, is replaced by the same weight (corresponding to 213 $cm^3$) of commercial activated bauxite having a particle diameter between 3 and 6 mm.

After 450 hours of operation, the sulphur yield in the reactor in only 34.9%.

This shows that bauxite, which is a natural aluminium oxide containing iron, is not equivalent as a deoxidation catalyst to the alumina impregnated with iron sulphate, which constitutes a deoxidation catalyst according to the invention.

EXAMPLE 5

361 g (481 $cm^3$) of the same alumina as in Example 2 are placed in an adiabatic reactor.

The gas to be processed, the flow rate of which when measured under normal conditions is 2 $m^3/h$, contains 9% $H_2S$, 4.5% $SO_2$, 20% $H_2O$ and 0.1% $O_2$ by volume, the rest being nitrogen and carbon dioxide.

This gas is fed into the reactor, the inlet temperature of which is maintained at 230° C.

After 350 hours of operation, the sulphur yield is 46%.

EXAMPLE 6

A deoxidation catalyst is prepared by impregnating one liter of an activated alumina, in the form of 4 to 6 mm balls and having a specific area of 240 $m^2/g$, with a solution consisting of 1500 ml of water, 50 ml of normal sulphuric acid, 500 g of $FeSO_4 \cdot 7H_2O$ and 95 g of $Cu(NO_3)_2 3H_2O$. The impregnation time is one hour.

After draining the impregnated balls are dried at 120° C. for three hours, then roasted in air at 350° C. for three hours.

The catalyst obtained has a specific area of 225 $m^2 g$ and a porous volume of 0.42 $cm^3/g$. It contains 3.2% of iron and 1.1% of copper by weight.

150 g (195 $cm^3$) of this catalyst are placed in an adiabatic reactor, followed by 217 g (289 $cm^3$) of the same alumina as that used in Example 2. A gas containing 9% $H_2S$, 4.5% $SO_2$, 27% of water, 0.1% of oxygen and 59.4% of nitrogen is then fed into this reactor at a rate of 2 m³/h (measured under normal conditions). The gas inlet temperature to the reactor is maintained at 229° C. The gas first encounters the deoxidation catalyst then the alumina. After 400 hours of operation, the sulphur yield in the reactor is still 75.3%.

In contrast, as the results of Example 5 show, without the deoxidation catalyst the sulphur yield in the reactor, containing only a traditional CLAUS catalyst, is only 46% after 350 hours of operation.

EXAMPLE 7

A deoxidation catalyst is prepared by impregnating the same activated alumina as that of Example 6 with an aqueous solution of 100 g of nickel nitrate per liter.

The catalyst is dried at 110° C. for three hours, then roasted at 350° C. for four hours. Its nickel content is then 4.82% by weight.

180 g (183 cm³) of this catalyst are placed in an adiabatic reactor, followed by 361 g (481 cm³) of the same activated alumina as used in Example 2.

A gas of the same composition as the gas processed in Example 6 is fed at a flow rate of 2 m³/h (measured under normal conditions) to the reactor charged in this manner, with the gas inlet temperature to the reactor being maintained at 230° C. The gas first encounters the deoxidation catalyst then the alumina.

After 350 hours of operation, the sulphur yield in the reactor is still equal to 74.7%.

EXAMPLE 8

This application relates to the desulphurisation of residual gases in which the CLAUS reaction takes place on contact with an alumina based catalyst under temperature conditions such that the elementary sulphur produced remains adsorbed on the catalyst. After a certain reaction time, the catalyst is relieved of its sulphur by heating to 300° C. There is thus a succession of cycles, each of which comprises a sulphur adsorption stage and a regeneration stage, i.e. sulphur elimination.

The volume of catalyst used is 334 ml. The gas flow is 182 l/h (measured at 20° C.), corresponding to a contact time of 6.6 s at 136° C.

The volumetric composition of the processed gas is as follows:

| $H_2S$ | 0.8% | $H_2O$ | 29% |
|---|---|---|---|
| $SO_2$ | 0.4% | $N_2$ | 51.72% |
| $CO_2$ | 18% | $O_2$ | 0.08% (800 vpm) |

Each adsorption cycle at 136° lasts 18 hours.

The regeneration comprises 1½ hours of heating from 136° to 300° C., then 3 hours at 300° C., then cooling from 300° C. to 136° C. for 1½ hours. During heating and regeneration, the gas blown through contains 10% $H_2S$, 33.6% $H_2O$ and 56.4% of nitrogen. Cooling is carried out with a gas containing 37.34% $H_2O$ and 62.66% $N_2$.

Two series of such operating cycles are carried out using 334 ml of catalyst consisting of balls of activated aluminium of 2 to 5 mm diameter. In the first series, the whole of the catalyst consists of this alumina, while in the second series, 253 ml of the same alumina are preceded by 81 ml of the same balls impregnated with ferrous sulphate, as described in Example 1, containing 4.5% of Fe to form a deoxidation catalyst.

The table given hereinafter shows the average sulphur yields obtained in each of the operating cycles.

| | Average % yield per cycle | |
|---|---|---|
| Cycle No. | Alumina alone I | With deoxidation bed II |
| 1 | 98.5 | 99.1 |
| 2 | 97.3 | — |
| 3 | 96.6 | 97.1 |
| 4 | — | 95.7 |
| 6 | 90.5 | — |
| 7 | 89.6 | 94.7 |
| 8 | 86.0 | 94.5 |
| 10 | — | 94.3 |
| 13 | 84.2 | — |
| 19 | 84.8 | — |
| 20 | 84.4 | — |
| 23 | — | 94.0 |

In series I, the $H_2S+SO_2$ concentration in the effluent is of the order of 1 850 vpm after the twentieth cycle, while in series II, the concentration reaches only 720 vpm, i.e. less than half, after 23 cycles.

The figures for series I show that the 800 vpm of oxygen present in the processed gas have caused the yield to fall to about 84% after 13 cycles. In contrast, the yield in series II is still 94% after 23 cycles because of the presence of the deoxidation catalyst before the gas passes into the traditional alumina.

EXAMPLE 9

Operations identical to those of the preceding example are carried out, but the deoxidation catalyst consists of 117 ml of activated alumina impregnated with zinc sulphate placed in front of 217 ml of the same activated alumina, but not impregnated. The yield stabilizes at around 94% after 25 cycles.

The improvement according to the invention, namely disposing a deoxidation catalyst upstream of the traditional CLAUS catalyst, may still be used with advantage when the gas to be processed, containing $H_2S$, $SO_2$ and small quantities of oxygen, also contains small concentrations (generally less than 5% by volume) of COS and $CS_2$, for in this case by operating at temperatures between 180° and 400° C., an almost total elimination (of the order of 95% and more) of the COS and $CS_2$ compounds is observed.

An example of processing such a gas is given hereinafter by way of non-limiting example.

EXAMPLE 10

A non-impregnated activated alumina in the form of balls of diameter between 4 and 6 mm and of specific area 270 m²/g is placed in an adiabatic reactor in which the gas inlet temperature is maintained at 250° C.

2 m³/h (NTP) of a gas containing 8% $H_2S$, 4% $SO_2$, 0.3% COS, 0.3% $CS_2$, 20% $H_2O$, 0.2% $O_2$ and the rest nitrogen and carbon dioxide are passed into this reactor, the time of contact of the gas with the alumina being 5 seconds (NTP).

After 500 hours of operation the conversion of COS is almost complete, while the conversion of the $CS_2$ is only 70%. p Operating under similar conditions, this test is repeated in a manner according to the invention by replacing the said alumina with a catalyst formed from a first bed of alumina impregnated with ferrous sulphate in the form of balls of 4 to 6 mm diameter and with an iron content of 4% by weight and a specific area of 240 m²/g, followed by a second catalyst bed consisting of the previously used alumina, the gas to be processed encountering first the alumina impregnated with ferrous sulphate, then the non-impregnated alumina.

The thickness of each catalyst bed is such that the time of contact of the gas to be processed with the impregnated alumina and with the non-impregnated alumina are 1.5 s and 3.5 s respectively (NTP). After 500 hours of operation, the conversion of COS is total and the conversion of $CS_2$ is 95%.

We claim:

1. A Claus process for the production of sulphur by the action of $H_2S$ on $SO_2$ in the presence of an oxide catalyst which comprises contacting a gas containing $H_2S$ and $SO_2$ and 50–5000 vpm $O_2$ in at least one catalytic reaction zone containing a deoxidation catalyst and a Claus oxide catalyst such that said gas encounters for 0.1–3 seconds NTP the deoxidation catalyst prior to encountering the Claus oxide catalyst, said deoxidation catalyst consisting of a supported metal compound of at least one metal selected from the group consisting of iron, nickel, cobalt, copper and zinc, the support having a surface area of at least 100 $m^2/g$ and a porosity of at least 0.2 ml/g, said deoxidation catalyst containing about 0.5–10% by weight of metal relative to the Claus oxide catalyst, whereby the magnitude of said Claus catalyst activity degradation with time is retarded by use of said deoxidation catalyst.

2. A process as claimed in claim 1, characterised in that the metal compound of the deoxidation catalyst is iron sulphate.

3. A process as claimed in claim 1, characterised in that the support is a silico-aluminate.

4. A process as claimed in one of claims 1, characterised in that the deoxidation catalyst and the oxide catalyst are used at temperatures below the dewpoint of the sulphur.

5. A process as claimed in claim 4, characterised in that the deoxidation catalyst is periodically desulphurised by a gas containing $H_2S$ between 250° and 400° C.

6. A process as claimed in claim 1 characterised in that the volume of deoxidation catalyst is about 5 to 50% of the volume of the oxide catalyst.

7. A process as claimed in claim 1 characterised in that in addition to the main sulphur compounds in the form of $H_2S$ and $SO_2$, the gas to be processed also contains secondary sulphur compounds in the form of COS and $CS_2$ in concentrations less than 5% by volume.

8. A process as claimed in claim 1 wherein the support has a surface area greater than 150 $m^2/g$ and wherein the weight of said metal is 2–6% of the weight of said Claus oxide catalyst.

9. A process as claimed in claim 6 characterized in that the volume of the deoxidation catalyst is 10 to 40% of the volume of the oxide catalyst.

10. A process as claimed in claim 1 characterized in that the deoxidation catalyst and the oxide catalyst are superposed.

11. A process as claimed in claim 8 characterized in that the volume of the deoxidation catalyst is 10 to 40% of the volume of the oxide catalyst, and the deoxidation catalyst is ferrous oxide supported on alumina.

* * * * *

UNITED STATES PATENT AND TRADEMARK OFFICE
CERTIFICATE OF CORRECTION

PATENT NO. : 4,192,857
DATED : March 11, 1980
INVENTOR(S) : Jacques Tellier, et al.

It is certified that error appears in the above-identified patent and that said Letters Patent are hereby corrected as shown below:

Column 3, line 38, for "reacted" read -- roasted --; line 39, for "no" read -- so --; and line 42, for "nm" read -- mm --.

Column 7, lines 26-27, for "Claus oxide" read -- deoxidation --.

Column 8, line 3, for "claims" read -- claim --; and line 21, for "Claus oxide" read -- deoxidation --.

Signed and Sealed this

Fifteenth Day of July 1980

[SEAL]

Attest:

SIDNEY A. DIAMOND

Attesting Officer

Commissioner of Patents and Trademarks